(12) United States Patent
Allor et al.

(10) Patent No.: US 7,240,288 B2
(45) Date of Patent: Jul. 3, 2007

(54) METHOD AND SYSTEM FOR MAKING RESOURCES AVAILABLE

(75) Inventors: Jason M. Allor, Seattle, WA (US); Daniel C. Patton, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 293 days.

(21) Appl. No.: 09/739,856

(22) Filed: Dec. 18, 2000

(65) Prior Publication Data

US 2002/0075325 A1 Jun. 20, 2002

(51) Int. Cl.
G06F 3/00 (2006.01)
G06F 15/16 (2006.01)

(52) U.S. Cl. ............ 715/736; 715/734; 709/203; 709/204

(58) Field of Classification Search ............ 345/749, 345/850–855, 781; 715/750, 765, 853; 709/223
See application file for complete search history.

(56) References Cited

U.S. PATENT DOCUMENTS

| | | | |
|---|---|---|---|
| 5,200,864 A | 4/1993 | Dunn et al. | |
| 5,274,772 A | 12/1993 | Dunn et al. | |
| 5,295,242 A * | 3/1994 | Mashruwala et al. ...... | 715/853 |
| 5,335,328 A | 8/1994 | Dunn et al. | |
| 5,384,669 A | 1/1995 | Dunn et al. | |
| 5,414,570 A | 5/1995 | Fry et al. | |
| 5,517,670 A | 5/1996 | Allen et al. | |
| 5,535,335 A | 7/1996 | Cox et al. | |
| 5,539,918 A | 7/1996 | Allen et al. | |
| 5,701,137 A * | 12/1997 | Kiernan et al. ............. | 715/853 |
| 5,933,599 A * | 8/1999 | Nolan ........................ | 715/734 |
| 5,946,691 A | 8/1999 | Lee et al. | |
| 5,953,724 A * | 9/1999 | Lowry ........................ | 715/853 |
| 5,956,715 A | 9/1999 | Glasser et al. | |
| 6,028,602 A * | 2/2000 | Weidenfeller et al. ...... | 345/853 |
| 6,058,462 A | 5/2000 | West et al. | |
| 6,144,962 A * | 11/2000 | Weinberg et al. ........... | 345/749 |
| 6,147,687 A * | 11/2000 | Wanderski .................. | 345/853 |
| 6,154,748 A | 11/2000 | Gupta et al. | |
| 6,199,099 B1 | 3/2001 | Gershman et al. | |
| 6,230,318 B1 | 5/2001 | Halstead et al. | |
| 6,240,410 B1 * | 5/2001 | Wical ......................... | 345/853 |
| 6,281,896 B1 * | 8/2001 | Alimpich et al. ........... | 715/781 |
| 6,308,173 B1 | 10/2001 | Glasser et al. | |
| 6,335,733 B1 | 1/2002 | Keren et al. | |
| 6,418,446 B1 | 7/2002 | Lection et al. | |
| 6,442,549 B1 | 8/2002 | Schneider | |
| 6,515,656 B1 * | 2/2003 | Wittenburg et al. ........ | 345/853 |
| 6,606,649 B1 | 8/2003 | Schwitters et al. | |
| 6,664,978 B1 * | 12/2003 | Kekic et al. ................ | 715/733 |
| 6,885,633 B1 * | 4/2005 | Mikkonen ................... | 370/217 |

* cited by examiner

Primary Examiner—Weilun Lo
Assistant Examiner—Truc T. Chuong
(74) Attorney, Agent, or Firm—Lee & Hayes, PLLC (57) ABSTRACT

A method and system for making resources available is provided, in which a hierarchy, such as a tree having expandable and collapsible branches, is presented on a user interface. The hierarchy represents a logical arrangement of resources that available to a user. The hierarchy may be organized in a variety of ways, such as by resource category, functional area, project, sub-project, or task grouping. The resources made available may, for example, allow employees of an organization to perform tasks. When a user selects a node on the hierarchy, a group of links that are usable to open files or execute programs is presented. These links may be used to access the available resources and, for example, accomplish tasks of the organization.

34 Claims, 7 Drawing Sheets

METHOD AND SYSTEM FOR MAKING RESOURCES AVAILABLE

TECHNICAL FIELD

This invention relates generally to the creation of links to resources such as data files and programs, and, more particularly, to presenting a hierarchy and associating a group of links to the resources with each node in the hierarchy.

BACKGROUND OF THE INVENTION

Disseminating computer resources, such as data files and programs, throughout an organization for use by employees in performing their duties can be a challenging task. First, there may be many different managers who are responsible for getting these resources out. For example, an accounting department of a large company may have a payroll section and an information technology (IT) section, each of which is spread out among different sites. The head of the payroll section may want to make sure that all of his/her (hereinafter "his") employees have the latest version of the client-side payroll software installed on their terminals, and that they all have the latest version of the payroll processing procedure manuals. The head of the IT section may, on the other hand, wish to insure that: all of the employees in the company have the latest anti-virus programs, all newly hired employees have a copy of the user's manual for each major piece of software, and that, when there is a problem with a piece of software, all employees know who the correct contact person is in the IT section.

Currently, organizations make such resources available to their members on various internal web sites. There are problems with this approach, however. One is that it typically forces individuals to go through multiple web links before they can find the resources in which they are interested. Another is that it is not very extensible, since all changes to a web site have to be channeled through the web master. For example, the IT department described above may have to issue new antivirus software updates as often as once a week. Under the current web page scheme, this requires the individual responsible for the updates to contact the IT web master, provide a path to the update installation program, and remind the web master to post a link to the installation program on the IT web site.

Another example of how challenging it is to make software resources available to large groups of individuals is in the area of software testing. Software companies often expend more time, money, and manpower on testing software than on actual software development. There may be literally thousands of tests, test documents, test methods, and test procedures that have to be disseminated to the various test teams and individual test engineers. The current solution to this problem is found in the use of test management software to organize and consolidate all of the thousands of tests. However, current test management software provides no convenient mechanism for providing additional resources needed to run each test, such as executable programs, documentation, or a way to email the person who wrote the test.

Thus it can be seen that there is a need for a method of making resources available that avoids the above-mentioned disadvantages.

SUMMARY OF THE INVENTION

In accordance with this need, a method and system for making resources available is provided, in which a hierarchy, such as a tree having expandable and collapsible branches, is presented on a user interface. The hierarchy represents a logical arrangement of resources that available to a user. The hierarchy may be organized in a variety of ways, such as by resource category, functional area, project, sub-project, or task grouping. The resources may be made available may, for example, allow employees of an organization to perform tasks. When a user selects a node on the hierarchy, a group of links that are may be used to open files or execute programs is presented. These links may be used to access the available resources and, for example, accomplish tasks of the organization.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The invention is generally directed to a method and system for making resources available to multiple users via computer. The resources are presented in a hierarchy, such as a graphical "tree" structure having multiple nodes or "branches." The resources are divided into, for example, resource categories, functional areas, projects, sub-projects, or task groupings, and this division is reflect in the organization of the nodes in the hierarchy. Each may have child nodes, grandchild nodes, and so on. A user may then select a node of the hierarchy. In response to the user's selection, a group of links to resources associated with the node are displayed. The user may then activate a link to open files and/or execute programs to access the resources. If the user has sufficient access permission, he/she (hereinafter "he") may also add links to the displayed link group in order to add to the resources that are available. Once the user adds a link to a group, the link then becomes available to other users having at least read access permission for that node.

Although it is not required, the invention may be implemented by computer-executable instructions, such as program modules, that are executed by a computer. Generally, program modules include routines, programs, objects, components, data structures and the like that perform particular tasks or implement particular abstract data types.

The invention may be implemented on a variety of types of computers, including personal computers (PCs), handheld devices, multi-processor systems, microprocessor-based on programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
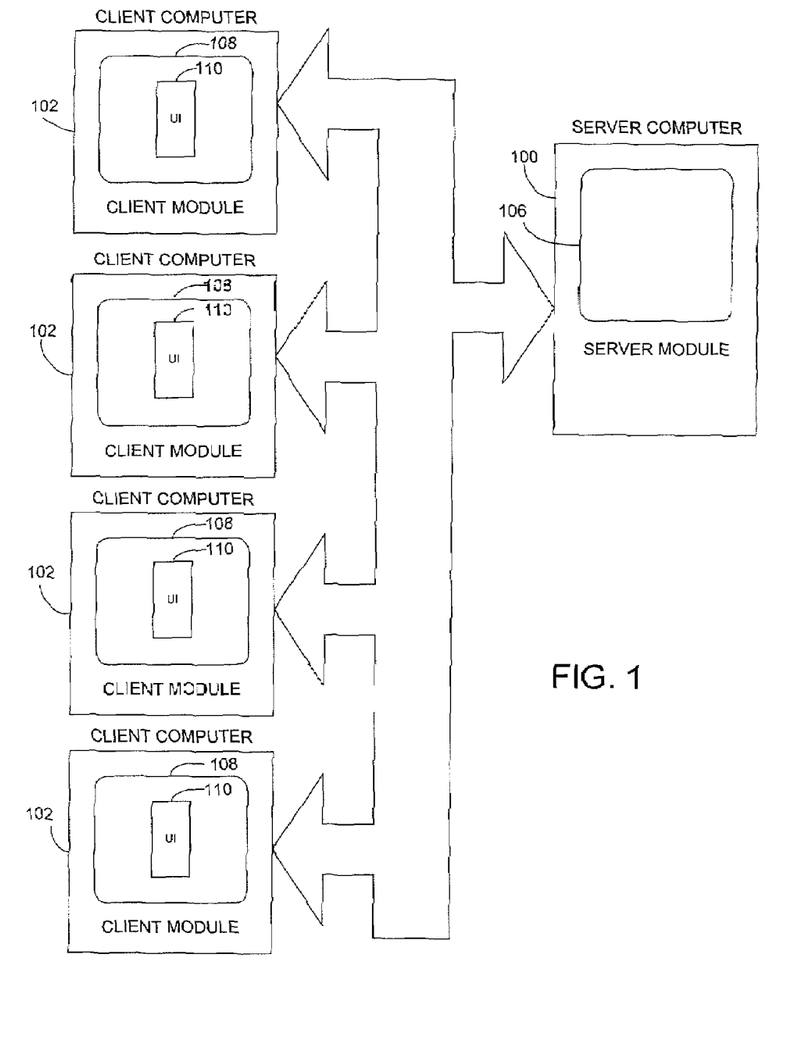
FIG. 1 is an example of a network.
Figure 2:
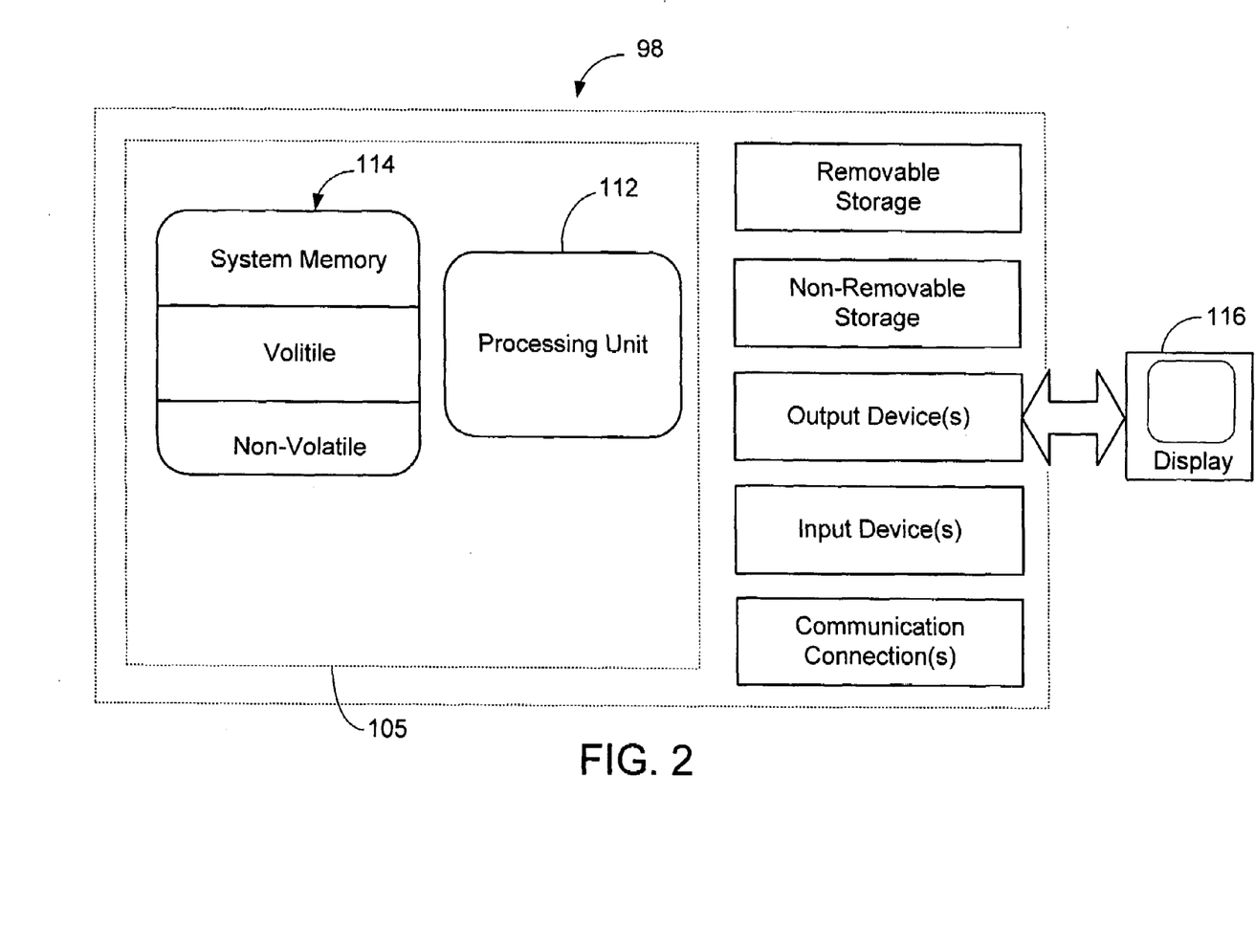
FIG. 2 is an example of a computer.

The invention may be implemented in a networked environment, as shown in FIG. 1. The example network includes a server computer 100 and several client computers 102. The server computer 100 communicates with the client computers 102 through well-known wired or wireless media. The server computer 100 executes a server module 106 for providing services to the client computers. Each of the client computers 102 executes a client module 108. The client module 108 has a user interface (UI) 110 through which a user can communicate. The user can input data and execute commands through the UI 110. The client module 108 can then translate this input into properly structured application programming interface (API) calls that are sent back to the server module 106. The server module may then respond to these calls by taking certain actions, and giving results back to the client module 108. These results may then be displayed to the user on the UI 110. Although only four The server computer 100 and the client computers 102 include many well-known hardware and software components in addition to the modules 106 and 108. Referring to a FIG. 2, an example of a basic configuration for a computer on which the system described herein may be implemented is shown. In its most basic configuration, the computer 98 typically includes at least one processing unit 112 and memory 114. Depending on the exact configuration and type of the computer, the memory 114 may be volatile (such as RAM), non-volatile (such as ROM or flash memory) or some combination of the two. This most basic configuration is illustrated in FIG. 2 by dashed line 105. Additionally, the computer may also have additional features/functionality. For example, computer 98 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 98. Any such computer storage media may be part of computer 98.

Computer 98 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not of limitation, communication media includes wired media such as a wired network or direct-wired connection, and wireless media such as acoustic, RF, infrared and other wireless media. The term computer readable media as used herein includes both storage media and communication media.

Computer 98 may also have input devices such as a keyboard, mouse, pen, voice input device, touch input device, etc. Output devices such as a display 116, speakers, a printer, etc. may also be included. All these devices are well known in the art and need not be discussed at length here.

To solve the problems of making computer resources available in a software test environment, an embodiment of the invention includes a test management program, hereinafter referred to as a "test manager." The test manager organizes software tests by category, such as by the product being tested and the type of test being performed, and presents the tests and their categories on a user interface (UI) in a hierarchical structure, such as a tree. A test engineer can then navigate through the parent and child nodes until he finds the test or set of tests that he wishes to run. When he selects the test or set of tests, a group of links appears on the UI. By activating one or more of the links, the test engineer may open files or execute programs that allow him to view test documentation, run test programs, install software needed to perform the test(s), email the developer or "owner" of the test, and the like. The test owner may go through the same UI to add or update links in order to make additional test resources available to the other test engineers. Once a link in a link group has been added or updated, all other users can then activate the link to access the test resource. There are many possible implementations for a "link," including a file link, such as an LNK file used in the MICROSOFT WINDOWS family of operating system, or an internet link, such as a uniform resource locator (URL).

Figure 3:
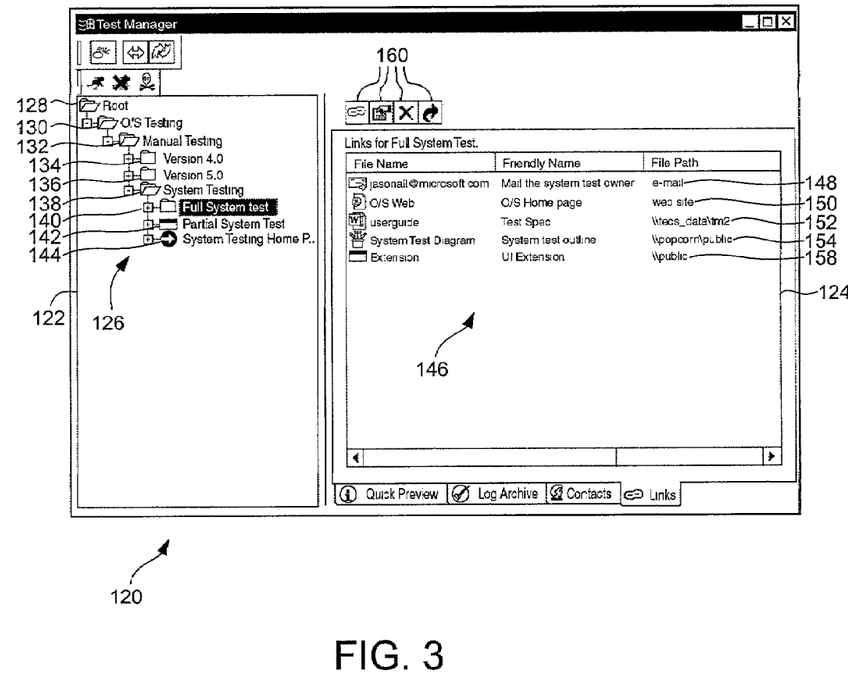
FIGS. 3–6 are examples of configurations for a user interface; and,
FIG. 7 is an example of a software architecture.

To display the test categories and the tests, along with the links associated with them, the UI may be arranged into multiple panes. As shown in FIG. 3, a UI 120 includes a pane 122 for displaying tests, groups of tests, and test categories, and a pane 124 for displaying the links associated with the node that is currently selected in pane 122. Displayed within the pane 122 is a tree 126 having nodes 128, 130, 132, 134, 136, 138, 140, 142 and 144. Currently, node 140—"Full System Test"—is selected. Pane 124 includes a link group 146, which is associated with the node 140, and a set of control buttons 160. As shown in FIG. 3, pane 124 displays information about each link, including its file name, a "friendly" or explanatory name, and its path. The link group 146 includes the following links: a link 148 for opening an email program and automatically creating an editable blank message to the test owner; a link 150 to the home page of the operating system test group; a link 152 to a MICROSOFT WORD document that contains a user manual for the "Full System Test"; a link 154 to a diagram of the "Full System Test"; and a link 158 to a dynamic-linked library (DLL) of an extension to the UI 120. The user activates a link by double-clicking it or pressing "enter." When implemented in conjunction with the MICROSOFT WINDOWS family of operating systems, activating a link causes the appropriate application program to be launched. For example, activating the link 152 would cause the operating system to launch MICROSOFT WORD and open the linked user manual. Activating the link 150, on the other hand, would cause the operating system to open MICROSOFT INTERNET EXPLORER and download the web page of the operating system test group.

According to an embodiment of the invention, a user with the appropriate access permission may add, delete or modify links in a link group. In the "test manager" embodiment of the invention, for example, the owner of a particular test or set of tests is likely to be the person with such permission. Accordingly, the following description of adding, deleting and modifying links will proceed from the test owner's point of view. To modify a link, the test owner selects the link from the pane 124 (FIG. 3) and "right clicks" the mouse. A menu then appears (not shown), giving the option to modify the link. The test owner then selects that option and is then presented with a dialog box that allows him to enter the modifications. To add a link, the test owner right clicks on the pane 124 and selects "add a link" from the menu that appears. The test owner then goes through a dialog box to enter information concerning the link, such as the path of the file (if appropriate), the type of link (e.g. document, internet, email), and any additional features that are to be used. Finally, to delete a link, the test owner need only select it, right click, and select "delete" from the menu that appears. Other methods of adding, modifying, or deleting links include the use of a "pull down" menu, or using one or more of the buttons 160.

Once a link has been modified, added, or deleted, other users who navigate through the tree 126 and select, for example, the "Full System Test" node 140 will have access to the modified or added links, and will no longer see the deleted links. Thus, if the test owner wishes to make a new test procedure available to the various test teams, then he need only add a link to the procedure, insuring that the link is associated with the node representing the test or set of tests. He may also add links to higher level nodes as well. For example, if he wished to make a new test program available to all test engineers in the "System Testing" group, regardless of which tests they were going to run, he could select the node 138 in the pane 122 and add a link to that test program. The link would then be associated with the node 138, and would appear in the pane 124 whenever a user selected the node 138.

Figure 4:
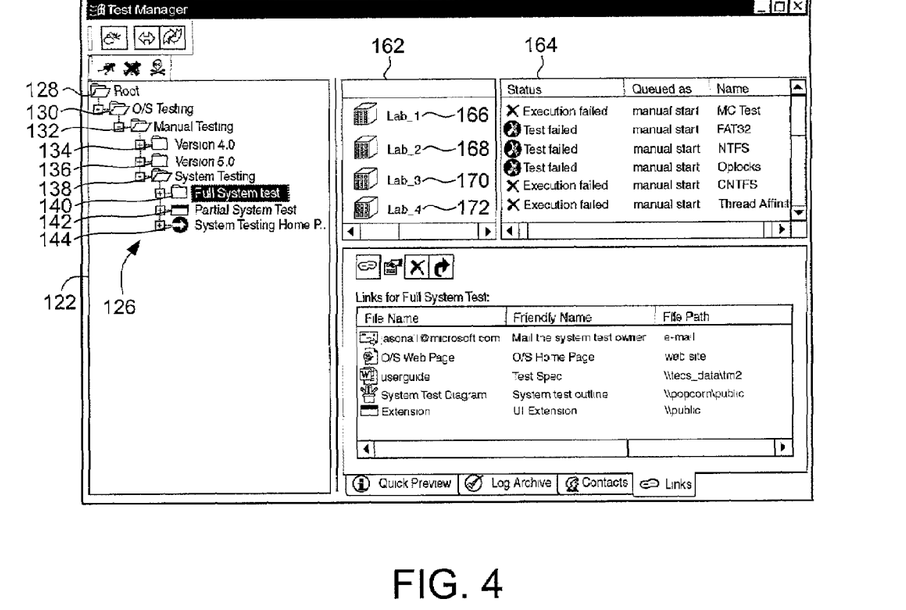
Figure 5:
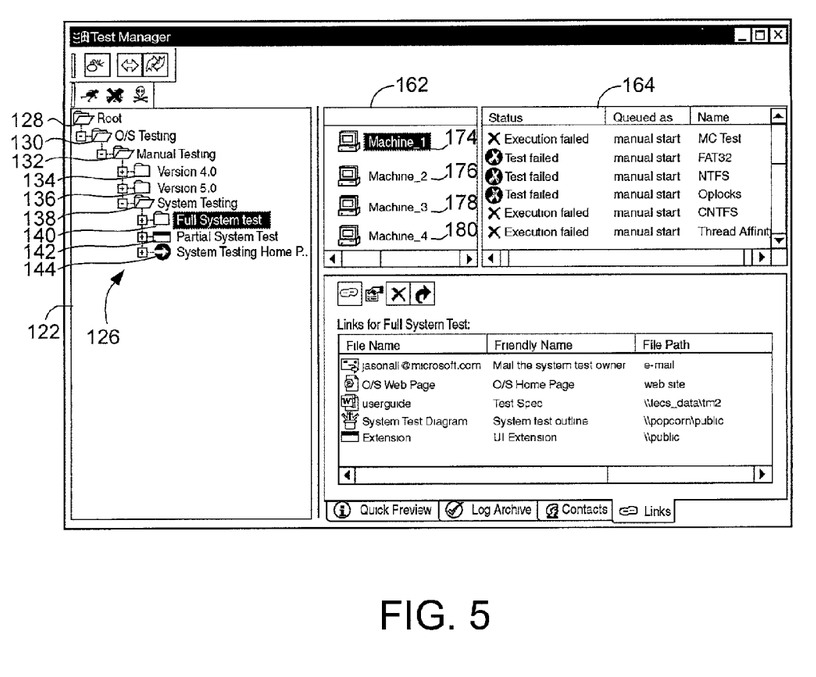

Another possible feature of the "test manager" embodiment is illustrated in FIGS. 4 and 5. Two additional panes, numbered 162 and 164, are provided to show which computers are currently being used for testing (pane 162) and the status of each computer's testing queue (pane 164). In FIG. 4, the pane 162 shows a series of icons 166, 168, 170 and 172. Each icon represents a test lab. When the user selects a test lab, Lab_2 for example, a series of icons representing the individual computers in that test lab are shown in pane 162, as shown in FIG. 5. Icons 174, 176, 178, 180 and 182 (FIG. 5) each represent a computer in Lab_2, each of which has its own work queue. Pane 164 shows which tests are currently in the work queue of the computer selected in pane 162. Currently, Machine_1 has been selected, and therefore the tests shown in pane 164 are those that are in the work queue of Machine_1. Pane 164 also includes information as to the name, status, and last result for the test, as well as when or how the test is to be executed ("queued as"). As shown, the work queue of Machine_1 currently contains six tests, which were previously queued for manual execution and have already been executed. The links shown in the pane 124 may then be links to resources that are useful in running the tests.

To put a test or set of tests into the work queue of a computer, a user may locate the node representing the test or set of tests in the tree 126, drag the node with the mouse over to the pane 164, and drop the node. The test manager responds to this user input by adding copies of the test or tests represented by the node to the work queue of the computer currently selected in pane 162. The tests added to the node may also include tests contained in the child and grandchild nodes as well. For example, if the user drags and drops the "System Testing" icon 138 onto the "Machine_1" icon 174, the test manager puts the tests associated with the "System Testing," "Full System Test," and "Partial System Test" into the work queue of the computer named "Machine_1."

There are many other possible implementations for panes 162 and 164. For example, pane 162 may have iconic representations of individual employees instead of computers. Each employee may also have a "work queue" maintained on, for example, a corporate network. A manager may wish to give newly hired employees a set of manuals to read and some software that needs to be installed on their workstations. The manager could then put all of the necessary files and documentation on the network and create a "New Hire" node for the tree 126. As soon as a new employee showed up on the list of employees in pane 162, the manager could then drag the "New Hire" node to the pane 164 and have copies of all of the necessary documents/programs added to the employee's work queue.

Figure 6:
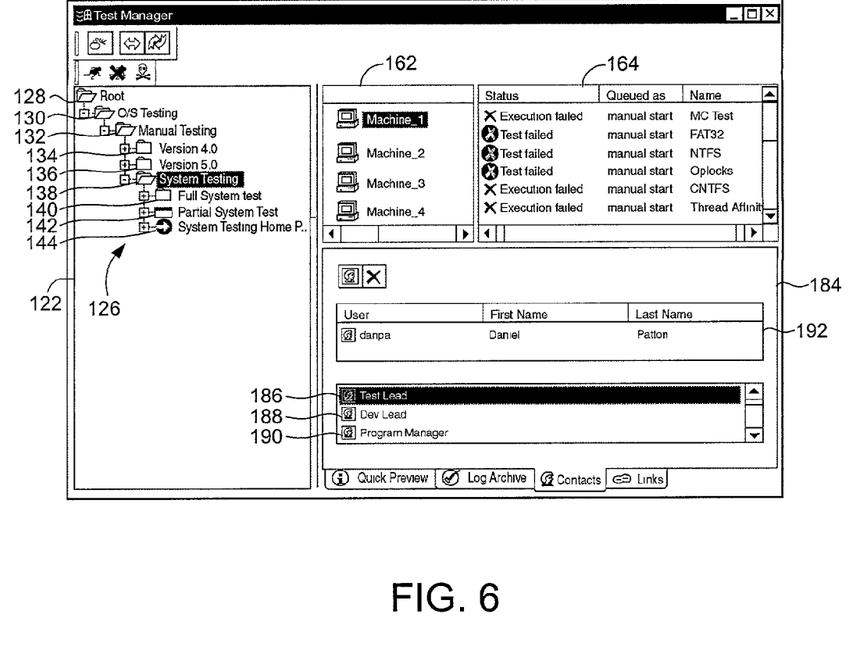

Yet another possible feature of the "test manager" embodiment is illustrated in FIG. 6. A "contacts" pane 184 may be provided for allowing a user to view contact information for a node in the tree 126. For example, when the system testing node 138 is selected in pane 122, the pane 184 lists the titles of each contact person that is involved in System Testing. In this case, the System Testing group has a lead tester (test lead—icon 186), a lead developer (dev lead—icon 188) and a program manager (icon 190). When the user selects one of the contact icons, information about the person represented by the icon appears in a viewing area 192. In this example, the Test Lead is "Daniel Patton," and his username is "Danpa." This feature makes it easy to identify the key players in each area of testing, so that if there are any problems, the responsible person or persons can be quickly notified.

Figure 7:
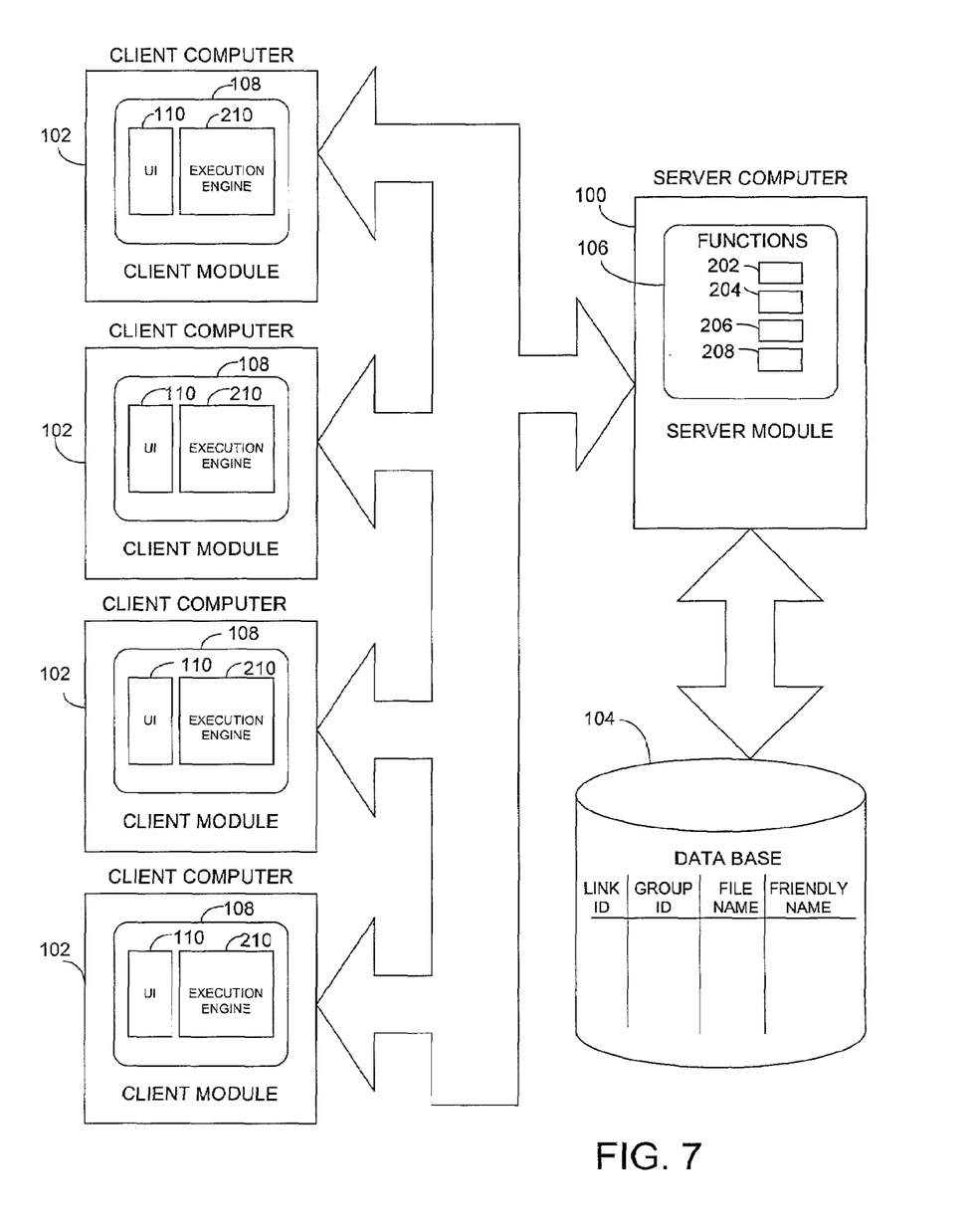

The software architecture for practicing the invention may be implemented in a variety of ways. An example of such an architecture is shown in FIG. 7. Its basic components include those of FIG. 1, as well as additional components, including: a database 104 for storing links to resources; server module functions 202, 204, 206 and 208, for managing the addition, modification, deletion and retrieval of the links stored in the database 104; and a client module execution engines 210 for executing link on each client computer in response to user input.

Each client module 108 can call one or more server module functions in response to inputs received from the user via the UI 110. For example, when the user right clicks on the pane 124 (FIG. 3) and chooses "create new link" from the menu that appears, the client module 108 gathers the necessary information about the link from a dialog box, such as the type of link being created, the path of the file being linked, and a description for the link. The client module 108 then calls an API of the function 202 to create the link, and passes the gathered information to the function via the API. This information is passed in the form of four parameters:

(1) an Area parameter—to indicate what type of item with which the link is being associated. In the context of the "test manager" described above, the link may be associated with, for example, a particular test, test group, machine, or lab;

(2) an Object ID parameter—the ID of the item with which the link is being associated.

(3) a Link parameter—a string that contains the full path to the file being linked; and, (4) a friendly name parameter—a short description that the user has entered to describe the contents of the linked file.

The function 202 then creates the link through a well-known procedure, assigns a Link ID to the link, stores the link in the database 104, and returns the Link ID to the client module 108.

If the user chooses to modify a link via the on-screen menu and the dialog boxes, the client module 108 calls the function 204 and passes the Link ID, Link descriptive string, and Friendly Name to the function 204. To delete a link in response to a user input, the client module 108 calls the function 204 and passes the Link ID of the link to be deleted.

When the user selects an item on the UI 110 (e.g. a node, a computer, a test, or a group of tests), the client module 108 calls the function 208 and passes the Area parameter and the Object ID parameter for the selected item. The function 208 then searches the database 104 to determine whether there are any links associated with the item. If so, then the links are returned to the client module 108 and displayed on the UI 110.

Referring again to FIG. 7, the execution engine 210 is used by the client module 108 to launch the appropriate application program and retrieves the appropriate file when the user activates a link. For example, if the link points to an email address, the execution engine 210 loads the user's email program and sets up an email for submission to that address. If the link points a web page, then the execution engine 210 loads the user's web browser and navigates to that page. In performing its functions, the execution engine 210 parses the link string to determine whether it points to a file on the local machine, a file on the network, a web page address, or an email address. When implement on a computer running one of the MICROSOFT WINDOWS family of operating systems, the execution engine will call various well-known Win32 APIs to load the link.

To maintain the database 104, the server module 106 assigns each link a Link ID, a Group ID, a File Name and a Friendly Name. The Link ID and Friendly Name have already been described. The File Name is simply the name used by the server operating system to identify the link. The Group ID is used to identify the tree nodes to which groups of links are assigned. For example, if the Full System Test node 140 (FIG. 3) is identified as "node #2," then the Group ID assigned to each of the links 148, 150, 152, 154 and 158 will be '2' as well.

It can thus be seen that a new a useful method and system for making resources available has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. At least one computer-readable storage medium having computer-executable instructions for performing a method to enable a plurality of users to collaborate, the method comprising:

displaying in a first pane a graphical hierarchy having a plurality of nodes, each node of the plurality of nodes adapted to make, upon selection, one or more resources accessible for a collaboration;

in response to user selection of a node of the plurality of nodes, presenting in a second pane one or more links, each respective link of the one or more links associated with a respective resource of the one or more resources; wherein activation of a link of the one or more links enables access to an associated resource;

displaying in a third pane a plurality of computer representations, each respective computer representation of the plurality of computer representations corresponding to a respective computer that can be used to contribute to the collaboration;

in response to user selection of a computer representation of the plurality of computer representations, presenting in a fourth pane a work queue for a respective computer that corresponds to the selected computer representation; wherein the work queue includes multiple tasks that are assigned to be performed, at least partly, by the respective computer that corresponds to the selected computer representation; and adding a task to the multiple tasks of the work queue when a link of the one or more links from the second pane is dropped at the fourth pane.

2. The at least one computer-readable storage medium of claim 1, wherein the method further comprises:

enabling a user to cause the respective computer to execute a task of the multiple tasks from the work queue.

3. The at least one computer-readable storage medium of claim 1, wherein the method further comprises:

enabling a first user to add at least one task to the multiple tasks included in the work queue.

4. The at least one computer-readable storage medium of claim 3, wherein the enabling further comprises at least one of:

dragging at least one link of the one or more links from the second pane and dropping the at least one dragged link at the fourth pane; or dragging a node of the plurality of nodes from the first pane and dropping the dragged node at the fourth pane.

5. The at least one computer-readable storage medium of claim 3, wherein the method further comprises:

enabling a second user to cause the respective computer to execute the at least one task that is added by the first user to the multiple tasks of the work queue.

6. The at least one computer-readable storage medium of claim 1, wherein each resource of the one or more resources comprises a data file or a computer program.

7. The at least one computer-readable storage medium of claim 1, wherein activation of a link comprises opening a data file or executing a computer program.

8. The at least one computer-readable storage medium of claim 1, wherein the graphical hierarchy is organized by at least one of resource category, functional area, project, sub-project, or task grouping.

9. The at least one computer-readable storage medium of claim 1, wherein the collaboration comprises a testing project and the one or more resources comprise testing-related data files or computer programs.

10. The at least one computer-readable storage medium of claim 9, wherein activation of a link results in at least one of displaying test documentation, running a test program, installing software to perform a test, or emailing a developer or owner of a test.

11. The at least one computer-readable storage medium of claim 9, wherein the graphical hierarchy is organized by category, including by product being tested and test type being performed.

12. The at least one computer-readable storage medium of claim 9, wherein each task of the multiple tasks comprises at least part of a test; and wherein the method further comprises:

executing, by the respective computer that corresponds to the selected computer representation, the at least part of a test for each task of the multiple tasks that are included in the work queue of the respective computer.

13. The at least one computer-readable storage medium of claim 9, wherein the presenting in a fourth pane a work queue comprises:

presenting the multiple tasks of the work queue in the fourth pane, each task of the multiple tasks including at least a name of the task and a stabs or last result of the task.

14. The at least one computer-readable storage medium of claim 1, wherein the method further comprises:

enabling a user to add a link to, to delete a link from, or to modify a link of the one or more links that are presented in the second pane and that are respectively associated with resources of the one or more resources.

15. The at least one computer-readable storage medium of claim 14, wherein the user tat is enabled to add, delete, or modify links has an appropriate access permission but other users with at least read access permission can activate the one or more links presented in the second pane.

16. The at least one computer-readable storage medium of claim 1, wherein the method further comprises:

displaying a plurality of titles of a plurality of contact persons responsive to selection of a node of the plurality of nodes; and in response to user selection of a title of the plurality of titles, presenting contact information for the contact person of the selected title.

17. At least one computer-readable storage medium having computer-executable instructions for performing a method to enable a plurality of members of an organization to collaborate, the method comprising:

displaying in a first pane a graphical hierarchy having a plurality of nodes, each node of the plurality of nodes adapted to make, upon selection one or more resources accessible for a collaboration;

in response to user selection of a node of the plurality of nodes, presenting in a second pane one or more links, each respective link of the one or more links associated with a respective resource of the one or more resources; wherein activation of a link of the one or more links enables access to an associated resource;

displaying in a third pane a plurality of member representations, each respective member representation of the plurality of member representations corresponding to a respective member of the plurality of members that are to contribute to the collaboration;

in response to user selection of a member representation of the plurality of member representations, presenting in a fourth pane a work queue for a respective member that corresponds to the selected member representation; wherein the work queue includes multiple tasks that are assigned to be performed, at least partly, by the respective member that corresponds to the selected member representation; and adding a task to the multiple tasks of the work queue when a link of the one or more links from the second pane is dropped at the fourth pane.

18. The at least one computer-readable storage medium of claim 17, wherein the method further comprises:

enabling a first member to add at least one task to the multiple tasks included in the work queue.

19. The at least one computer-readable storage medium of claim 18, wherein the enabling further comprises at least one of:

dragging at least one link of the one or more links from the second pane and dropping the at least one dragged link at the fourth pane; or dragging a node of the plurality of nodes from the first pane and dropping the dragged node at the fourth pane.

20. The at least one computer-readable storage medium of claim 18, wherein the method further comprises:

enabling the respective member that corresponds to the selected member representation to perform the at least one task that is added by the first member to the multiple tasks of the work queue.

21. The at least one computer-readable storage medium of claim 17, wherein each resource of the one or more resources comprises a data file or a computer program.

22. The at least one computer-readable storage medium of claim 17, wherein activation of a link comprises opening a data file or executing a computer program.

23. The at least one computer-readable storage medium of claim 17, wherein the graphical hierarchy is organized by at least one of resource category, functional area, project, sub-project, or task grouping.

24. The at least one computer-readable storage medium of claim 17, wherein the organization comprises a company, and the plurality of members comprise a plurality of employees.

25. The at least one computer-readable storage medium of claim 17, wherein activation of a link results in at least one of displaying a manual or installing software.

26. The at least one computer-readable storage medium of claim 17, wherein the graphical hierarchy is organized by category, including by product being tested and test type being performed.

27. The at least one computer-readable storage medium of claim 17, wherein each task of the multiple tasks comprises at least part of a testing task; and wherein the method further comprises:

causing, by the respective member that corresponds to the selected member representation, performance of the at least part of a testing task for each task of the multiple tasks that are included in the work queue of the respective member.

28. The at least one computer-readable storage medium of claim 17, wherein the method further comprises:

enabling a managing member to add a link to, to delete a link from, or to modify a link of the one or more links that are presented in the second pane and that are respectively associated with resources of the one or more resources.

29. The at least one computer-readable storage medium of claim 28, wherein the managing member is permitted to add, delete, or modify links that are presented in the second pane and that are associated with resources but other members with at least read permission can activate the one or more links presented in the second pane.

30. The at least one computer-readable storage medium of claim 17, wherein the method further comprises:

displaying a plurality of titles of a plurality of contact members responsive to selection of a node of the plurality of nodes; and in response to user selection of a title of the plurality of titles, presenting contact information for the contact member of the selected title.

31. The at least one computer-readable storage medium of claim 17, wherein the presenting in a second pane one or more links comprises:

presenting at least a file name and a friendly name for the one or more links.

32. The at least one computer-readable storage medium of claim 17, wherein tasks of the multiple tasks included in the work queue may be performed by the respective member that corresponds to the selected member representation by running a program or reading a file.

33. A system configured to effectuate actions comprising:

displaying in a first pane a graphical hierarchy having a plurality of nodes, each node of the plurality of nodes adapted to make, upon selection, one or more resources accessible for a collaboration;

in response to user selection of a node of the plurality of nodes, presenting in a second pane one or more links, each respective link of the one or more links associated with a respective resource of the one or more resources; wherein activation of a link of the one or more links enables access to an associated resource;

displaying in a third pane a plurality of computer representations, each respective computer representation of the plurality of computer representations corresponding to a respective computer that can be used to contribute to the collaboration;

in response to user selection of a computer representation of the plurality of computer representations, presenting in a fourth pane a work queue for a respective computer that corresponds to the selected computer representation; wherein the work queue includes multiple tasks that are assigned to be performed, at least partly, by the respective computer that corresponds to the selected computer representation; and adding a task to the multiple tasks of the work queue when a link of the one or more links from the second pane is dropped at the fourth pane.

34. A system configured to effectuate actions comprising:

displaying in a first pane a graphical hierarchy having a plurality of nodes, each node of the plurality of nodes adapted to make, upon selection, one or more resources accessible for a collaboration;

in response to user selection of a node of the plurality of nodes, presenting in a second pane one or more links, each respective link of the one or more links associated with a respective resource of the one or more resources; wherein activation of a link of the one or more links enables access to an associated resource;

displaying in a third pane a plurality of member representations, each respective member representation of the plurality of member representations corresponding to a respective member of the plurality of members that are to contribute to the collaboration;

in response to user selection of a member representation of the plurality of member representations, presenting in a fourth pane a work queue for a respective member that corresponds to the selected member representation; wherein the work queue includes multiple tasks that are assigned to be performed, at least partly, by the respective member that corresponds to the selected member representation; and adding a task to the multiple tasks of the work queue when a link of the one or more links from the second pane is dropped at the fourth pane.

* * * * *